Feb. 12, 1963   E. A. HENRY   3,077,107
SIGNAL STORAGE DISPLAY EQUIPMENT FOR ULTRASONIC TESTING
Filed Jan. 3, 1958   2 Sheets-Sheet 1

United States Patent Office 3,077,107
Patented Feb. 12, 1963

3,077,107
SIGNAL STORAGE DISPLAY EQUIPMENT FOR ULTRASONIC TESTING
Elliott A. Henry, Newtown, Conn., assignor to Sperry Products, Inc., Danbury, Conn., a corporation of New York
Filed Jan. 3, 1958, Ser. No. 707,052
5 Claims. (Cl. 73—67.8)

This invention pertains to display arrangements for scan type testing equipments, to provide a non-transitory visual representation of the information obtained during the latest scan. It is particularly intended to furnish the operator of scan-type ultrasonic test equipment with a supervisory record of the echo signals from the current or latest scan, to supplement ordinary cathode ray displays or permanent record signal recorders, but can be utilized wherever a large and bright display of scan signals is desired.

As a preferred example of the application of the invention, the same will be described below in connection with an ultrasonic material inspection apparatus of the immersion tank type, using an immersion liquid as the couplant between an ultrasonic inspection head or search unit and the workpiece being inspected. Arrangements of this kind are well known, including ones in which the scan or search procedure relates amplitude of echo or boundary signals to the distance along one dimension of the workpiece (A-scan), or in which the scan relates the depth location (of a boundary or defect giving a certain echo magnitude) to the distance along a dimension perpendicular to depth (B-scan), to provide a cross-sectional view, or other. The equipment may signal the detection of a defect aurally or otherwise, display its location or magnitude on a transitory screen, or make a permanent test record, or any combination of these.

The information displays heretofore employed for the guidance of the test operator are perfectly adequate for small parts and rapid scanning, because, for example, the persistence of the cathode ray tube screen provides in effect a non-transistory record of the echo information. Even here, however, any one display unit will not suffice. Thus a search for the existence of a defect at coordinate positions X, Y in a B-scan display does not provide useful information as to the defect amplitude, and reference must be made to another display, such as an A-scan display. Where the parts are large, and/or the relative scan rate is slow, only the portion of the workpiece directly under the search unit is displayed. This is adequate when manual scanning is employed, but with machine-programmed scanning it requires an unattainable constancy of observation by the operator if defects are not to be overlooked.

The present invention solves this problem by a more permanent type of information storage display, which also combines comfortably adequate display brightness, large effective screen size, simplicity and relatively low cost as compared with other display systems adaptable to the problem. In brief, the invention utilizes an information display and memory formed by a coordinate array of a large number of neon or similar glow lamps, triggered or fired row-by-row as one scan direction is traversed. The triggered lamp or lamps in each row or column remain lit until the scan is complete, but are automatically extinguished before the next scan is commenced. The operator can thus refer to the display at any time during a scan, and if necessary prevent its "erasure" merely by stopping the scan. The firing of the tubes or lamps is readily accomplished by gates whose structure is adapted to the scan rates and which may be made quite simple and rugged. In the case of the slowest rates, as for the lengthwise carriage travel motion, mechanically operated switches can be used.

The invention will now be described in detail, by way of preferred example, and in its application to one type of inspection installation, reference being made to the accompanying drawings, in which.

Figure 1:
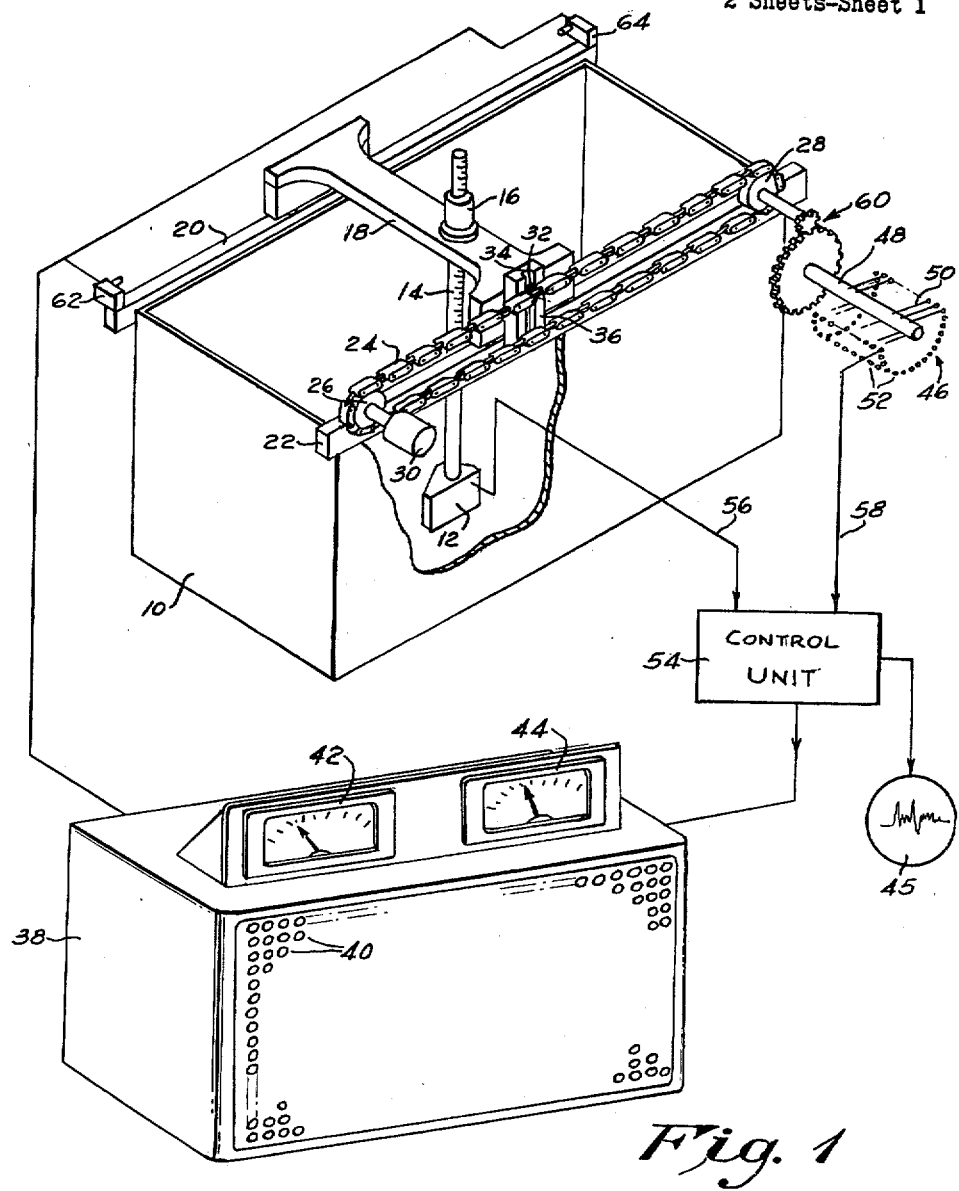
FIG. 1 is a diagrammatic perspective view of a complete installation, parts being broken away for clarity of illustration.

Referring first to FIG. 1, the immersion tank of a known form of ultrasonic inspection equipment is indicated by numeral 10, this tank containing the workpiece being inspected (not shown) and the coupling liquid which transmits ultrasonic compressional waves between the workpiece (and its interior) and the search unit 12. In the equipment shown, the latter is carried on a bar 14 which may be manually or automatically (under program control) raised and lowered to scan sequentially successive horizontal lines or belts along the workpiece. The raising and lowering gear is indicated at 16, and the bar 14 is supported from a carriage 18 which travels on rails 20, 22 along the upper longitudinal edges of the tank 10 to perform the lengthwise scan.

Various arrangements may be provided to control the carriage, but for simplicity of illustration a chain drive is shown in FIG. 1. The chain, of ordinary sprocket form, is designated by numeral 24, and is carried on sprockets 26 and 28 of which the former may be power driven as by a motor 30. A pin 32 on one sprocket link enters a vertical slot 34 in a block 36 on carriage 18, the slot being long enough to retain pin 32 during the entire path of its motion; that is, forward on the upper chain path and back on the lower. It follows that the carriage 18 will be traversed from end to end of the tank, and return, to perform the desired lengthwise scan motion. At each end the bar 14 may be raised or lowered, manually or automatically, as by gear 16, to cause a different "belt" or horizontal zone of the workpiece to be inspected.

Figure 2:
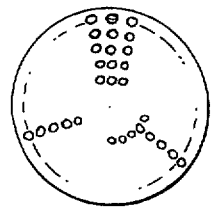
FIG. 2 is an elevational view of a different display arrangement.

Turning now to the novel display unit of the invention, the same is represented as a cabinet 38 whose front wall contains an array, herein shown as rows and columns, of lamps 40 which are of the gaseous trigger type such as the commercial NE-17 neon lamp. A rectangular (Cartesian) array is suitable for the rectangular scan pattern of FIG. 1, but a polar (circular row) array or other form can be employed for other scanning procedures, as indicated in FIG. 2. Lamps of this type will trigger or "fire" at a specified voltage on their electrodes, and will remain luminous until the voltage is reduced below a critical extinction level. The apparatus is arranged, in the form being described, so that as scanning of the workpiece progresses, one or more lamps in each vertical column of the display unit will be lighted (as by receipt of an echo signal from a workpiece defect or boundary), and remain lighted throughout that scan, to give a non-transitory display of the information. Prior to commencement of the next or return scan, all the lamps will be extinguished in preparation for the succeeding display, but can be kept lighted indefinitely merely by interrupting the scanning process.

Since in the form described the lighting of a particular lamp will indicate only the location of a defect or boundary, a large indicating meter 42 is provided to signal the magnitude of the echo signal as any lamp is fired, particularly for use where the operator repeats a scan of the same horizontal belt or zone to obtain such an indication. A second meter 44 is connected to indicate the magnitude of the far-boundary reflection of each horizontal position of the search unit; this information is useful in evaluating internal defects which lie in an unfavorable plane with respect to the ultrasonic beam direction. Numeral 45 designates the conventional cathode ray indicator as employed with commercial reflectoscopes, and which the display unit of this invention will supplement for the purposes stated above.

Since the horizontal scan will be relatively slow, the horizontal sweep control information can easily be obtained from a simple mechanical switch or commutator such as indicated at 46, and comprising a shaft 48 geared to chain sprocket 28 and carrying wipers 50 which engage in turn the contacts 52 of a cylindrical bank. There will be as many contacts in each axial row as there are lamps 40 in each column, and as shown the wipers 50 are double-ended to permit the contacts 52 to be arranged in a simple hemi-cylindrical array as in conventional selector switches.

Information signals in the form of voltages are carried from search unit 12 to a control unit 54 over channel 56, and scan signals in the form of selectively closed circuits are carried from switch 46 over a cable, indicated at 58, to the same control unit. Obviously, switch 46 could equally well be a stepping switch advanced by pulses from a simple pulsing device connected to chain 24. In any event, the arrangement represented by gearing 60 is designed to complete a traverse of the bank contacts for each longitudinal scan by the search unit; thus, there will be in total as many bank contacts as there are display lamps.

Limit switches 62 and 64, operated at each extremity of travel of carriage 18, "clear" the display by extinguishing all the lamps when either switch is operated, in a manner to be described below.

Figure 3:
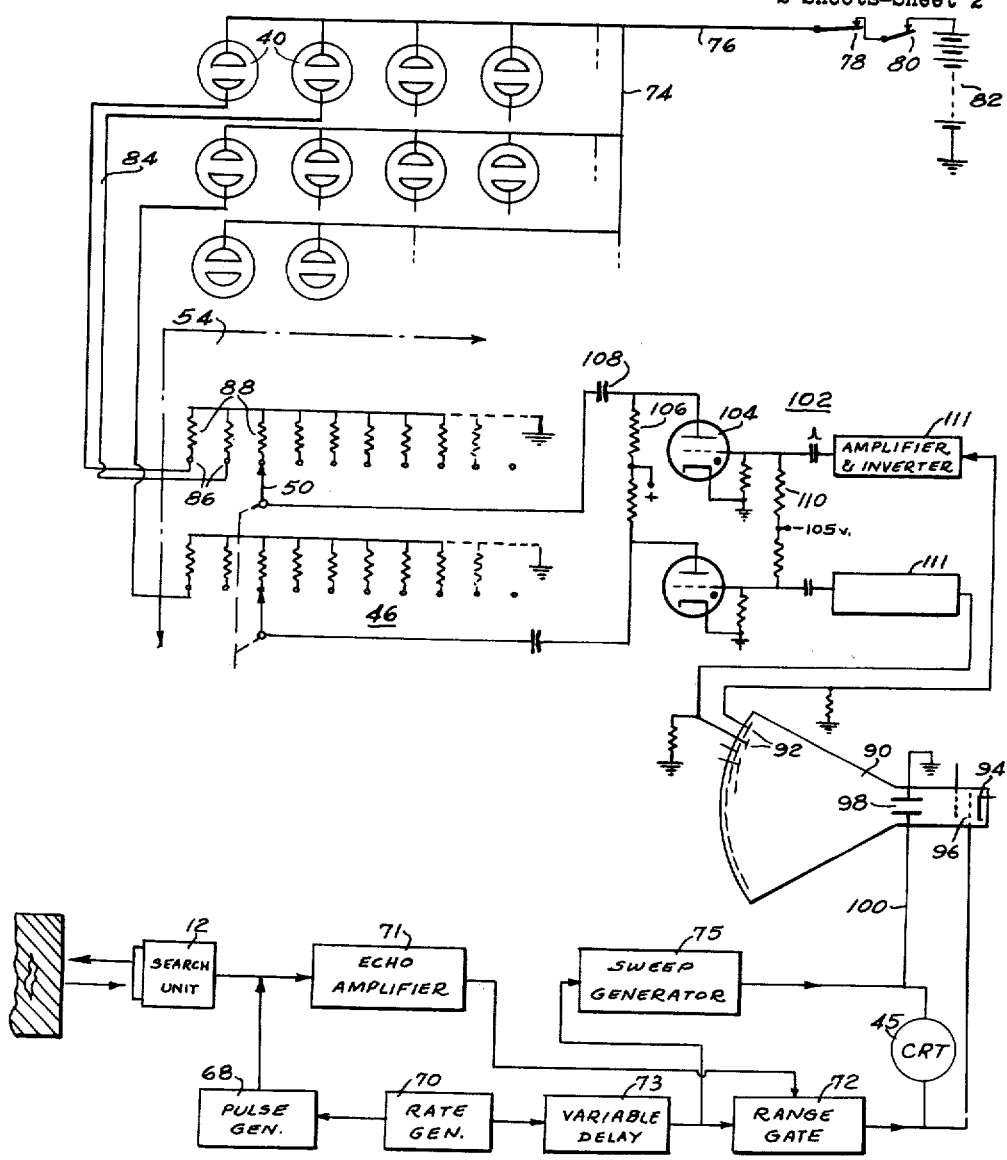
FIG. 3 is a schematic wiring diagram of the equipment, any conventional or well-known components being indicated in part as labelled blocks.

FIG. 3 illustrates, principally in the form of a wiring schematic, the remaining control devices and the typical circuit connections required. In this figure, the same numerals are used to designate elements already described. For clarity, however, the switch 46 is shown as developed out into the flat plane of the drawing, as is common in the electrical switching field. At the bottom of this figure, the usual components of an ultrasonic testing equipment are indicated in schematic form, since these may take any of the well known forms as shown in the literature and in issued patents. Briefly, the search unit 12, shown as cooperating with workpiece 66, includes a transmitting transducer and a receiving transducer, the transmitting transducer emitting ultrasonic wave trains at a high repetition rate, for example at the rate of 1,000 per second. Reflections from either boundary of the workpiece, or from fissures or defects in its body, are picked up by the receiving transducer, shaped, amplified, gated and otherwise treated, and applied as to the usual transitory display device such as oscilloscope 45, and/or to a recorder, not shown. In the present instance, there is indicated the pulse generator 68 which supplies the ultrasonic pulses to the search unit under control of a rate generator 70 which also synchronizes the sweeps of the display device in the known manner. The signals reflected and picked up by the receiving transducer of the search unit are amplified as at 71 and passed to a range gate 72 also controlled from rate generator 70 through a variable delay 73 so that reflections corresponding to the different depths in the workpiece will be synchronized to appear as signals related in the display to their respective depths of origin. In practice, a single crystal sreves as both transmitter and receiver transducer, as well understood in this art. The usual sweep generator 75 is triggered also from the rate generator 70, which constitutes the "clock" for the entire system.

It will be understood that the foregoing is entirely conventional, and has been greatly simplified because it is given here merely for the sake of explaining the way in which the display of the present invention is integrated into such existing systems. As has been indicated, the display furnished by the known transitory device 45 changes rapidly as the search unit is swept over a workpiece, and unless it is under constant observation, the existence of defects may easily be overlooked. The present invention provides a more permanent type of display which provides more readable indications and retains the information on display at least until completion of each sweep in the length direction of the workpiece, so that the operator can refer to any portion of the display until the same is erased ready for the next sweep.

A sufficient number of the display lamps 40 are shown in FIG. 3, arranged as in the columns and rows of the display panel, to indicate the manner in which all are connected. It will be seen that one side of each of the lamps is connected permanently, through conductors 74, 76 and the series-connected normally-closed contacts 78 and 80 of the limit switches 62 and 64 respectively, to a bias source indicated by battery 82. The bias voltage is selected so as to be slightly lower than the firing voltage of the typical neon lamp 40, but somewhat higher than its extinction voltage. Thus, when a relatively small triggering voltage is applied to the other electrode of any lamp, in the direction additive to the bias voltage, that lamp will be fired, and will remain fired (or lit) until the bias circuit for all of the lamps is opened by the operation of the carriage 18 as shown in FIG. 1.

The opposite electrode of each of the neon lamps 40 in the topmost row in FIG. 3 is connected to a respective contact on one level of switch 46. For the top row of lamps, the cabling is indicated by numeral 84, leading to contacts indicated at 86. Similar connections are provided for all of the lamps, the lamps in the second row being connected to respective contacts of the second level of the switch 46, and so on. Each of the switch contacts is also connected through a load resistor, indicated at 88, to a reference or ground level indicated by the usual symbol. It will be obvious to those skilled in electronics that if a suitable voltage is applied to any switch contact by means of the wiper for that level, such will in effect be added to the bias voltage supplied by source 82 and will fire the corresponding lamp and no others. Means for supplying such a trigger voltage, which will of course be much smaller than would be required to fire unbiased lamps, will now be described.

During the scan motion of the search unit across the workpiece, each of the wipers of switch 46 will rest in turn upon the contacts connected to the lamps in one vertical row of the display device. During this interval, it is necessary to fire any lamp corresponding to a depth within the workpiece from which a reflection of sufficient magnitude is received; this includes the boundary reflections if these are wanted and if the gate devices are so adjusted. It is preferred to employ for this purpose an electronic switch tube of the cathode ray type, indicated as a whole by numeral 90. The construction of such tubes is in itself also well known, corresponding closely to the construction of an ordinary cathode ray tube except that in place of a fluorescent screen there are provided a plurality of target electrodes 92 which may for example be insulatingly supported in the glass end wall of the tube. In the present form, the tube is arranged to sweep the cathode ray beam in only one direction, for example in the vertical direction as indicated, so as to scan in turn all of the targets. The beam is produced by the usual electron gun including thermionic cathode 94, usual focus and accelerating electrode or electrodes, intensity control electrode 96 and a single set of deflecting plates 98. The deflecting electrodes or plates are energized by a sweep voltage over conductor 100 from the sweep generator 75, so that the beam will fall upon each of the targets 92 in turn, unless cut off. In the present case, the conductor 96 is so biased that the beam remains cut off unless a reflection signal of sufficient (preferably predetermined and adjustable) magnitude is received from the range gate 72. Thus, no current reaches any target 92 except if a signal is to be displayed by that lamp corresponding to the horizontal position of the search unit, which controls through switch 46 the column of lamps 40 that is connected to the switch tube, and corresponding to the search depth within the workpiece, controlled by the synchronization of the range gate sweep and the sweep of the switch tube.

In the embodiment shown, there will be twenty targets in the switch tube 90, these corresponding to the twenty neon lamps in each column of the display device. A trigger circuit is provided for each of the targets, these being indicated by numeral 102; since the trigger circuits will be identical for all of the targets, only that one connected to the wiper of switch 46 at its uppermost level is shown in detail. The trigger circuit may comprise, for example, a gas triode or thyratron 104 having its anode connected through a load resistor 106 to a suitable positive potential, and coupled over coupling capacitor 108 to the switch wiper 50. The control electrode of the tube is connected to the corresponding target 92 of switch tube 90, and a bias resistor 110 connects the control electrode and the cathode. An inverting amplifier 111 converts the negative pulse from the anodes of tube 90 to a positive pulse needed to fire tube 104. When any tube 104 is triggered, the lamp 40 connected thereto will also be fired, and will remain lit even though the tube 104 is very quickly extinguished due to the reduction of its anode potential as condenser 108 recharges through resistor 106. These components are chosen to provide a time constant permitting tube 104 to be extinguished ready for the next sweep of the beam of tube 90.

It will be clear from the above that, if the beam current of switch tube 90 were not normally cut off in the absence of an echo signal from the range gate 72, the beam would continuously sweep over all of the targets 92, and indeed a small beam current (insufficient to operate the trigger circuits 102) may be so allowed. Upon occurrence of any echo signal passed by the range gate 72, which has the usual adjustable features, the beam current is momentarily increased to a value sufficient to fire the trigger circuit corresponding to the target toward which the beam is then directed, and the corresponding lamp 40 of the display is fired in turn. The trigger circuit will be reset (its thyratron 104 extinguished) before the search unit has moved to a position corresponding to the next column of neon lamps, but the neon lamp itself will remain lit, along with any other triggered lamps in that column, until one of switch contacts 78 or 80 is opened, at the end of one longitudinal scan of the search unit. If scanning is stopped, the neon lamps will remain lit indefinitely. At any time during each scan, therefore, the operator has an opportunity to supervise the entire result of the scan up to that point. Any condition requiring closer investigation can be more accurately observed by repeating the scan and noting the indications of meters 42 and 44 at the critical region.

The polar type of display in FIG. 2 is especially adapted for the scanning of workpieces which are solids of revolution, and can be obtained by connecting the scan and sweep switches just as already described, considering each circumferential row of lamps 40 as corresponding to the lamps in one horizontal row of the rectangular array of FIG. 1.

The apparatus described satisfies all of the objects of the invention in a convenient and highly efficient manner, but it will be obvious to the skilled workers in the art that various equivalents as to apparatus and circuitry can be devised and substituted for the particular arrangements described herein. Thus, the functions of the neon lamps and the trigger tubes could be combined in a grid-controlled neon lamp of known type. All such modifications are intended to be comprehended by the present invention, to the extent that they fall within the true scope and meaning of the appended claims.

What is claimed is:

1. Apparatus for ultrasonic inspection comprising: mechano-electric transducer means; means electrically coupled to said transducer means for generating and supplying thereto a pulse-type signal and having an output circuit providing a signal representing echo signals derived by said transducer means in response to echoes from an object under inspection; a scanning system associated with said transducer means for producing scanning cycles relative to the object; a plurality of trigger lamps mounted in planar coordinate array of rows to form a display; a biasing circuit connected to said lamps to maintain the same in a dark condition, but adapted to be lit in response to an echo signal; firing circuit means; a switch arranged to connect the lamps in each coordinate row successively to a portion of said firing circuit means during each of said scanning cycles; a switching device for cyclically connecting said firing circuit means to said output circuit, each cycle of said switching device being synchronizing in time with one of the pulses in said pulse-type signal; and means operable prior to the initiation of each scanning cycle to extinguish any lamps which were lighted during the preceding scanning cycle.

2. Ultrasonic inspection equipment in accordance with claim 1, wherein said coordinate array is a rectangular coordinate system.

3. Ultrasonic inspection equipment in accordance with claim 1, wherein said coordinate array is a polar coordinate system.

4. Ultrasonic inspection equipment in accordance with claim 1, wherein said portions of said firing circuit means each comprise a gaseous discharge device having an anode a cathode, and a control electrode, a supply circuit connected between said anode and said cathode and including a source of space current voltage, the connections between said switch and each portion of said firing circuit means comprising a circuit connected between a contact of said switch and a point in said supply circuit, and the connections between said switching device and each portion of said firing circuit means comprising a circuit connected between a contact element of said switching device and said control electrode.

5. Ultrasonic inspection equipment in accordance with claim 1, in which said switching device is a multi-target beam switching electron tube having one target connected to each portion of said firing circuit means.

References Cited in the file of this patent

UNITED STATES PATENTS

| | | |
|---|---|---|
| 1,779,748 | Nicolson | Oct. 28, 1930 |
| 2,021,010 | Jenkins | Nov. 12, 1935 |
| 2,049,763 | De Forest | Aug. 4, 1936 |
| 2,056,301 | Schroter | Oct. 6, 1936 |
| 2,120,971 | Bailey | June 21, 1938 |
| 2,136,441 | Karolus | Nov. 15, 1938 |
| 2,313,286 | Okolicsangi | Mar. 9, 1943 |
| 2,556,586 | Johnston | June 12, 1951 |
| 2,749,480 | Ruderfer | June 5, 1956 |
| 2,817,815 | Evans | Dec. 24, 1957 |
| 2,866,922 | Matarese | Dec. 30, 1958 |